Nov. 9, 1948.　　　J. J. FEDEVICH　　　2,453,311
STEERABLE VEHICLE UNDERCARRIAGE
Filed Nov. 5, 1947　　　　　　　　　　　　2 Sheets-Sheet 1
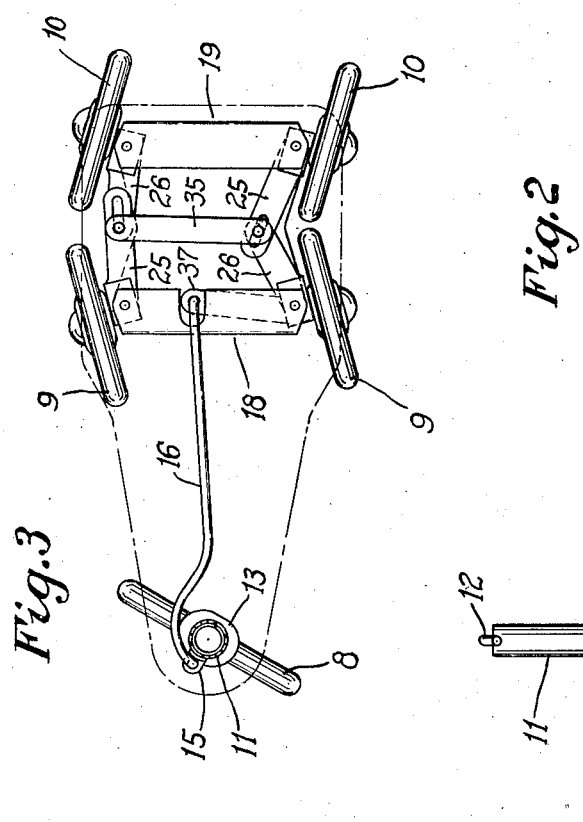
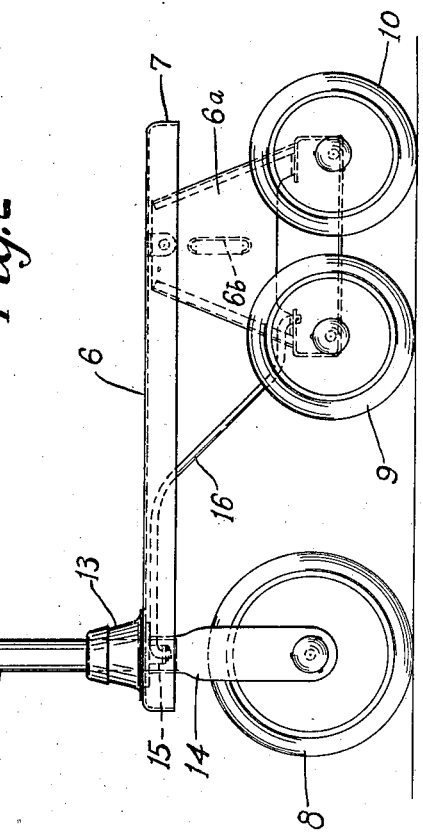
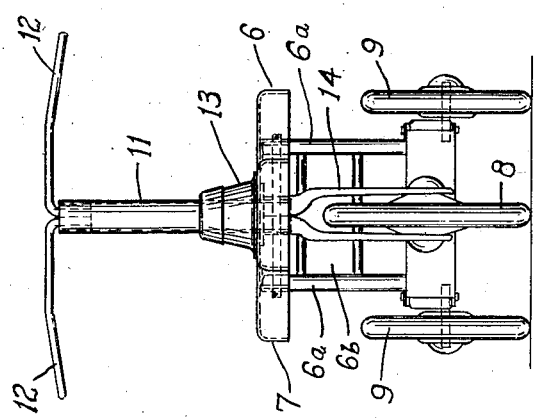
Inventor
Joseph J. Fedevich
Attorneys Nov. 9, 1948.                J. J. FEDEVICH                 2,453,311
                    STEERABLE VEHICLE UNDERCARRIAGE
Filed Nov. 5, 1947                                   2 Sheets-Sheet 2

Inventor
Joseph J. Fedevich
By Frease and Bishop
Attorneys

Patented Nov. 9, 1948

2,453,311

UNITED STATES PATENT OFFICE 2,453,311

STEERABLE VEHICLE UNDERCARRIAGE

Joseph J. Fedevich, Dover, Ohio

Application November 5, 1947, Serial No. 784,269

7 Claims. (Cl. 280—91)

1

The invention relates generally to vehicles, and more particularly to a vehicle having four wheels arranged in tandem fashion.

Certain vehicles including semi-trailers have been provided with a pair of tandem axles under the rear end of the vehicle for increasing the load capacity. In the conventional tandem axle arrangement none of the wheels of the tandem are steerable, and when the front end of the vehicle turns, the front wheels of the tandem must be skidded to follow around a turn. Such skidding causes excessive wear on the tires, and results in such strain on the vehicle undercarriage as to force the spring hangers and frame out of alignment.

On crowned and sloping road surfaces, a scuffing action is produced on the front tires and a reactive force is produced on the rear tires of such prior vehicles, resulting in additional strain and wear and causing a drag against pulling the vehicle.

It is an object of the present invention to provide a steerable four wheel tandem arrangement in which the rear wheels turn automatically in the opposite direction to the front wheels.

Another object is to provide a novel four wheel tandem arrangement which causes the front wheels to turn in unison in one direction and the rear wheels to turn in unison in the opposite direction.

Another object is to provide a four wheel tandem arrangement which enables a vehicle to make sharp turns without skidding any of the tires.

A further object is to provide a novel four wheel tandem arrangement which is easier to pull than the conventional tandem arrangement, and which produces less wear on the tires during turning or while driving over uneven roads.

A still further object is to provide a novel four wheel tandem arrangement utilizing individually steerable wheels adapted for turning in pairs in opposite directions and operatively connected to a front steering wheel for turning therewith.

Finally, it is an object of the present invention to provide a novel vehicle undercarriage having a four wheel steerable tandem arrangement connected to a front steerable wheel in a simple, compact and inexpensive construction.

These and other objects are accomplished by the constructions, arrangements and combinations comprising the present invention, a preferred embodiment of which is set forth in the following description and illustrated in the accompanying drawings, the nature of which is set forth in the following general statement, and which is defined in the appended claims.

In general terms, the vehicle undercarriage comprising the present invention includes a front steerable wheel under the front end of the vehicle and four wheels in a tandem arrangement under the rear end of the vehicle and operatively connected to said front wheel, the front and rear wheels being pivoted for individual steering on the front and rear tandem axles, with lever arms extending toward each other from the front and rear pivots and having overlapping inner ends provided with registering holes, there being pins in each pair of registering holes and a transversely extending link connecting the pins so that the front wheels turn together in the same direction as the front steerable wheel as the rear wheels turn together in the opposite direction and the transverse link moves transversely of the vehicle as the four tandem wheels turn simultaneously.

Referring to the drawings forming part hereof, in which a preferred embodiment of the invention is shown by way of example;

Fig. 1 is a front elevational view of a child's vehicle embodying the invention;

Fig. 2 is a side elevation thereof;

Fig. 3 is a plan view thereof, with the wheels turned in one direction, the steering post being shown in section with the seat and seat support removed;

Similar numerals refer to similar parts throughout the several views of the drawings.

Figure 4:
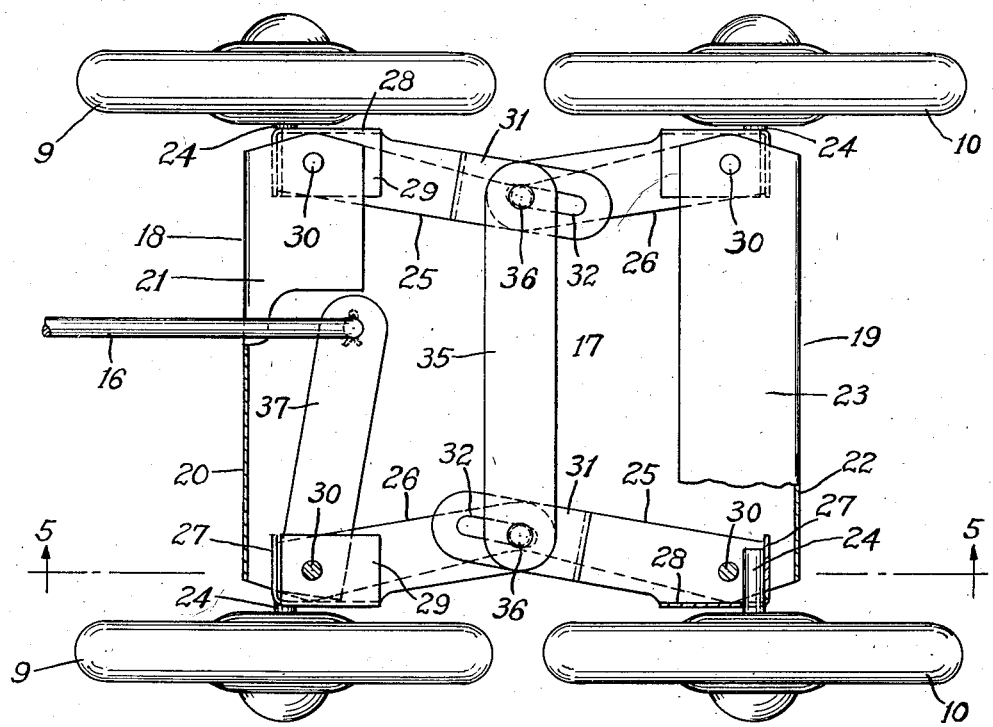
Fig. 4 is an enlarged partial plan view, partly in section, similar to Fig. 3.

While the drawings show the invention as embodied in a child's vehicle or kiddie car, it will be understood that the invention may be embodied in other kinds of wheeled vehicles, including truck and trailer combinations, without departing from the scope of the invention as defined in the appended claims.

The seat or load carrying platform 6 is preferably horizontal, and in this case it may be formed of sheet metal having a downturned rim flange 7 extending entirely around the platform. The vehicle shown has a single steerable front wheel 8 mounted under the front end of the platform, and four wheels arranged in tandem under the rear end of the platform, said tandem wheels preferably comprising a pair of front wheels 9 and a pair of rear wheels 10. As shown, all of the wheels may have rubber tires, and the front steerable wheel 8 may be larger in diameter than the tandem wheels 9 and 10.

In the present vehicle the front wheel 8 is steered by means of a steering post 11 having handle bars 12 at the top of the post and extending at right angles to the plane of the wheel 8, in a manner usual to the front wheel construction of a child's tricycle. As shown, the steering post 11 is journaled in a suitable fashion in a bearing indicated at 13 on the front end of the platform, and the lower end of the post has a fork 14 thereon in which the front wheel 8 is journaled in suitable bearings in a usual manner. Obviously, the front end of the platform 6 could be supported on a front axle mounted by a pair of front wheels, with any conventional means for steering the wheels.

Means for operatively connecting the front steerable wheel 8 to the rear tandem wheels for turning the tandem wheels with the front steerable wheel, preferably includes a crank arm 15 extending laterally from the steering post 11, and an operating rod 16 having its front end pivotally connected to said crank arm and extending rearwardly therefrom.

Figure 5:
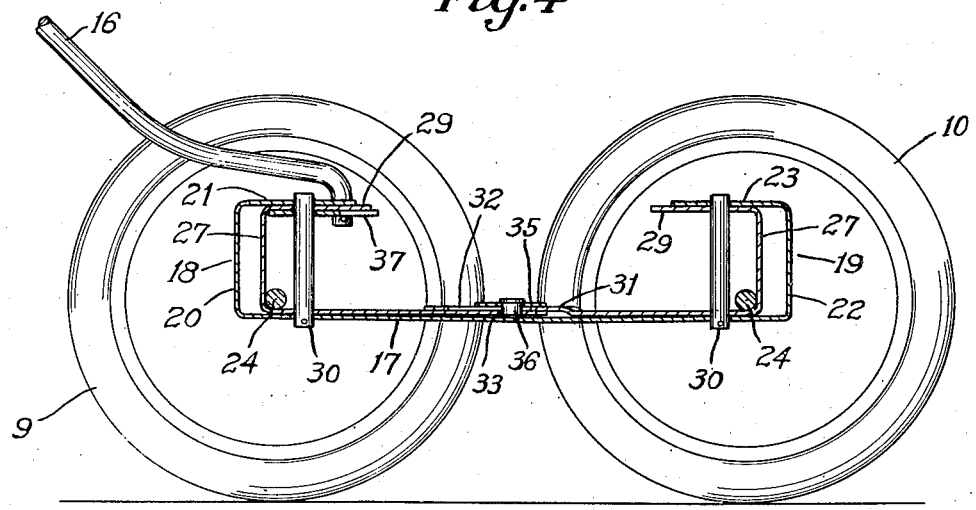
Fig. 5 is a transverse sectional view substantially on line 5—5, Fig. 4.

The novel vehicle undercarriage including the four tandem wheels 9 and 10 preferably includes a sheet metal frame having a flat bottom plate 17 and front and rear L shaped axle portions 18 and 19 respectively formed integral therewith. As shown in Figs. 4 and 5, the axle portion 18 includes a vertical flange 20 terminating in an upper horizontal flange 21, and the rear axle portion 19 includes a vertical flange 22 terminating in an upper horizontal flange 23. Means for supporting the rear portion of the seat 6 on the undercarriage preferably includes vertical side members 6a with a transverse brace 6b extending therebetween, and the members 6a and 6b may be channel-shaped in cross section as shown.

The front wheels 9 of the tandem are mounted for individual steering at the opposite ends of the front axle portion 18, and the rear tandem wheels 10 are mounted at the opposite ends of the rear axle portion 19. As shown, each of the wheels 9 and 10 may be provided with an inwardly extending stub axle 24, and the stub axles extend into the open ends of the L shaped axle portions 18 and 19 respectively. These stub axles 24 are secured as by welding to the outer ends of lever arms extending toward each other and overlapping each other at positions intermediate the front and rear axle portions 18 and 19.

One of the lever arms to which the front stub axle 24 is secured is indicated at 25 and extends rearwardly, and the other laterally opposite lever arm 26 is secured to and extends rearwardly from the other front axle 24. Another lever arm 25 is located diagonally opposite to the first lever arm 25 and extends forwardly from the diagonally opposite rear axle 24, while another lever arm 26 located diagonally opposite to the front arm 26 extends forwardly from the other rear axle 24.

Each lever arm 25 and 26 has at its outer end an L shaped portion formed by a vertical transverse flange 27 and a vertical longitudinal flange 28 facing the adjacent wheel. The vertical flange 27 is also connected to an upper horizontal flange 29 to form an L shaped portion within the L shaped axle portion of the frame. The stub axles 24 preferably extend through the vertical longitudinal flange 28 and are secured as by welding to the vertical transverse flange 27. The bottom flanges of the levers 25 and 26 are pivoted on the front and rear axle portions 18 and 19 by means of vertical pivot pins 30 which are pivoted in the bottom plate 17 of the frame and in the upper flanges of the axle portions 18 and 19. The pivot pins 30 are secured in the bottom flanges of the lever arms 25 and 26 and also in the top horizontal flanges 29 thereof.

The bottom flange of each of the lever arms 25 is preferably provided with a vertically offset portion 31 having a longitudinal slot 32 therein, and the offset portion 31 overlaps the end of the adjacent lever arm 26, there being a hole 33 in each lever arm 26 which registers with the slot 32 in the overlapping lever arm 25. A transverse link 35 extends between the overlapping portions of the lever arms 25 and 26 and is pivotally connected to said arms by pins 36, one pin extending through each registering slot 32 and hole 33.

Accordingly, when any one of the tandem wheels 9 and 10 is turned, the lever arms 25 and 26 together with the link 35 will cause the laterally opposite wheel to turn in the same direction and the other two wheels to turn in the opposite direction. In other words, when any one of the wheels 9 and 10 is turned from the position of Fig. 4 to the position of Fig. 3, the linkage comprising the lever arms and transverse link 35 will cause the other wheels to turn simultaneously, so that both front wheels 9 of the tandem turn in one direction while both rear wheels 10 turn in the opposite direction. As the tandem wheels turn from a position such as shown in Fig. 4 to a position such as shown in Fig. 3, the slot and pin connections 32, 36 compensate for the variation in the lengths from the pivots 30 of the various arms to the pins 36.

Means for connecting the operating rod 16 of the front steerable wheel 8 to the tandem wheels, so that the front tandem wheels turn in the same direction as the front wheel 8, may include a link 37 pivotally connected at one end to the rear end of the rod 16 and extending laterally therefrom, its other end being secured to one of the pivot pins 30 of the front axle portion 18, as best shown in Figs. 4 and 5. Thus when the front wheel 8 is turned counter clockwise as viewed in Fig. 3, the operating rod 16 moves forwardly to turn the link 37 counter clockwise about its pivot 30, turning or steering the wheels 9 in the same direction as the wheel 8 but to a lesser extent, and the linkage turns the wheels 10 in the opposite direction but to the same extent as the wheels 9. When the front wheel 8 is turned clockwise the link 37 is rotated clockwise and turns the wheels 9 and 10 toward positions opposite that shown in Fig. 3.

Thus the wheels 9 and 10 of the tandem are steerable by steering movement of the front wheel 8 so that they assume positions which track or follow the path of the front wheel in going around curves or turns. The result is that none of the wheels of the tandem are skidded in making a turn and the vehicle can travel around relatively sharp turns and over uneven roads with less wear on the tires. Moreover, the load carried by the tandem vehicle is easier to pull because of the absence of skidding and better tracking.

The novel vehicle undercarriage is simple, compact and inexpensive to construct, and easily operated. It is well adapted to be used in connection with various forms of conventional steering mechanisms for the front wheel or wheels of either towing or towed vehicles.

In the foregoing description, certain terms have been used for brevity and clearness, but no unnecessary limitations are to be implied therefrom beyond the requirements of the prior art, because such words are used for descriptive purposes and are intended to be broadly construed.

Having now described the invention, the construction and operation of a preferred embodiment thereof, and the new and useful results obtained thereby, the novel constructions, and reasonable mechanical equivalents obvious to those skilled in the art, are set forth in the appended claims.

I claim:

1. Vehicle undercarriage construction including front and rear axles arranged in tandem under the rear portion of the vehicle, a pair of wheels pivoted for individual steering on each of said axles, lever arms connected to each of said pivots, the lever arms on each side of the vehicle extending toward each other and having overlapping inner ends provided with vertically registering openings, at least one opening being elongated, and a transverse link pivotally mounted at its ends in said registering openings and pivotally connecting the overlapping ends of said lever arms.

2. Vehicle undercarriage construction including front and rear axles arranged in tandem under the rear portion of the vehicle, a pair of wheels pivoted for individual steering on each of said axles, lever arms connected to each of said pivots, the lever arms on each side of the vehicle extending toward each other and having overlapping inner ends provided with vertically registering openings, at least one opening being elongated, means for turning one of said wheels on its pivot, and a transverse link pivotally mounted at its ends in said registering openings and pivotally connecting the overlapping ends of said lever arms for causing the opposite wheel on the same axle to turn in the same direction and the other two wheels to turn in the opposite direction.

3. Vehicle undercarriage construction including front and rear axles arranged in tandem under the rear portion of the vehicle, a pair of wheels pivoted for individual steering on each of said axles, lever arms connected to each of said pivots, the lever arms on each side of the vehicle extending toward each other and having overlapping inner ends provided with registering openings, at least one opening being a slot, pins extending through each pair of registering openings, a transverse link connecting said pins, and means for causing movement of said link substantially lengthwise of itself for turning the two front wheels in one direction and the two rear wheels in the opposite direction.

4. Vehicle undercarriage construction including front and rear axles arranged in tandem under the rear portion of the vehicle, a pair of wheels pivoted for individual steering on each of said axles, lever arms connected to each of said pivots, the lever arms on each side of the vehicle extending toward each other and having overlapping inner ends provided with registering openings, a transverse link pivotally mounted at its ends in said registering openings, a front wheel under the front portion of the vehicle, means for steering said front wheel, and means operatively connecting said front wheel steering means to said tandem wheels for steering the front tandem wheels in the same direction as said front wheel.

5. Vehicle undercarriage construction including front and rear axles arranged in tandem under the rear portion of the vehicle, a pair of wheels pivoted for individual steering on each of said axles, lever arms connected to each of said pivots, the lever arms on each side of the vehicle extending toward each other and having overlapping inner ends provided with registering openings, a front wheel under the front portion of the vehicle, means for steering said front wheel, means operatively connecting said front wheel steering means to said front tandem wheels for steering the front tandem wheels in the same direction as said front wheel, and a transverse link pivotally mounted at its ends in said registering openings for simultaneously steering the rear tandem wheels in the opposite direction.

6. Vehicle undercarriage construction including front and rear axles arranged in tandem under the rear portion of the vehicle, a pair of wheels pivoted for individual steering on each of said axles, lever arms extending forwardly and rearwardly from said pivots and overlapping each other between said axles, a transverse link pivotally connected at its ends to both pairs of overlapping lever arms, a front wheel for steering the vehicle, means for steering said front wheel, and means operatively connecting said front wheel steering means to said tandem wheels for steering the front tandem wheels in the same direction as said front wheels.

7. Vehicle undercarriage construction including front and rear axles arranged in tandem under the rear portion of the vehicle, a pair of wheels pivoted for individual steering on each of said axles, lever arms extending forwardly and rearwardly from said pivots and overlapping each other between said axles, a front wheel for steering said vehicle, means for steering said front wheel, means operatively connecting said front wheel steering means to said front tandem wheels for steering said front tandem wheels in the same direction as said front wheel, and a transverse link pivotally connected at its ends to both pairs of overlapping lever arms for simultaneously steering the rear tandem wheels in the opposite direction.

JOSEPH J. FEDEVICH.

REFERENCES CITED

The following references are of record in the file of this patent:

UNITED STATES PATENTS

| Number | Name | Date |
| --- | --- | --- |
| 163,681 | Milliken | May 25, 1875 |
| 720,713 | Lieb | Feb. 17, 1903 |